(12) United States Patent
Jhou et al.

(10) Patent No.: US 11,522,307 B2
(45) Date of Patent: Dec. 6, 2022

(54) REMOVAL MECHANISM OF DAUGHTER BOARD

(71) Applicant: AIC INC., Taoyuan (TW)

(72) Inventors: Siang-An Jhou, Taoyuan (TW); Wei-Shih Wu, Taoyuan (TW)

(73) Assignee: AIC INC., Taoyuan (TW)

( * ) Notice: Subject to any disclaimer, the term of this patent is extended or adjusted under 35 U.S.C. 154(b) by 116 days.

(21) Appl. No.: 17/234,546

(22) Filed: Apr. 19, 2021

(65) Prior Publication Data

US 2022/0336978 A1  Oct. 20, 2022

(51) Int. Cl.
*H01R 13/62* (2006.01)
*H01R 12/70* (2011.01)
*G06F 1/18* (2006.01)

(52) U.S. Cl.
CPC ......... *H01R 12/7082* (2013.01); *G06F 1/185* (2013.01)

(58) Field of Classification Search
CPC .......... H01R 12/7082; H01R 13/62977; H01R 13/6335; G06F 1/185
USPC .................................................. 439/157, 160
See application file for complete search history.

(56) References Cited

U.S. PATENT DOCUMENTS

| | | | | |
|---|---|---|---|---|
| 5,657,204 A * | 8/1997 | Hunt | ..................... | H05K 7/1409 361/752 |
| 6,033,254 A * | 3/2000 | Neal | ..................... | H01R 12/88 439/377 |
| 6,094,358 A * | 7/2000 | Christensen | ............. | H05K 1/14 439/372 |
| 6,118,668 A * | 9/2000 | Scholder | ................. | G06F 1/184 361/801 |
| 7,097,476 B2 * | 8/2006 | Morikawa | ........ | H01R 13/62911 439/157 |
| 7,112,084 B1 * | 9/2006 | Mease | ..................... | G06F 1/184 439/342 |
| 7,145,780 B2 * | 12/2006 | Malone | ................ | H05K 7/1421 361/752 |
| 7,215,556 B2 * | 5/2007 | Wrycraft | ............. | H05K 7/1409 361/756 |
| 7,364,447 B1 * | 4/2008 | Desrosiers | ............. | G06F 1/186 439/372 |
| 8,105,098 B2 * | 1/2012 | Teoh | .................. | G01R 31/2867 439/157 |
| 8,366,464 B1 * | 2/2013 | Figuerado | ............... | G06F 1/185 439/160 |
| 9,740,249 B2 * | 8/2017 | Top | .................. | H01R 13/62922 |

(Continued)

*Primary Examiner* — Neil Abrams
(74) *Attorney, Agent, or Firm* — Chun-Ming Shih; HDLS IPR Services

(57) ABSTRACT

A removal mechanism of the daughter board includes a fixed frame, a moving frame, a moved frame and a handle. The fixed frame has a pushed portion. The moving frame is movably coupled to the fixed frame and has an oblique tapered edge. The moved frame is fixed to the daughter board and has a corresponding oblique edge. The handle is rotatably connected to the moving frame and has a pushing portion, and the pushed portion is on a rotation path that the pushing portion rotates with the handle. When the handle is operated, the pushing portion pushes the pushed portion, the moving frame moves relative to the fixed frame to push the corresponding oblique edge by the oblique tapered edge. The moved frame drives the daughter board to be removed from the connector.

10 Claims, 8 Drawing Sheets

(56) References Cited

U.S. PATENT DOCUMENTS 9,954,314 B2 * 4/2018 Mozer .............. H01R 13/62955
10,194,550 B2 * 1/2019 Fietz ....................... G06F 1/185

* cited by examiner

REMOVAL MECHANISM OF DAUGHTER BOARD

BACKGROUND OF THE DISCLOSURE

Technical Field

The technical field of this disclosure relates to a daughter board, and more particularly to a removal mechanism of a daughter board.

Description of Related Art

For a daughter board, it is necessary to detachably insert the plug portion into a connector and then fix the connector to a mainboard.

For certain electronic equipment, it is quite often to replace the daughter board, but the plurality of electrical contacts on the plug portion and the plurality of conductive terminals in the connector are extremely dense, and it is very laborious and time-consuming for plugging and unplugging. Once a slight deviation in the removal direction occurs during the removal of the daughter board, the electrical contacts and the conductive terminals may be damaged. However, the related-art method of removing the daughter board manually does not guarantee a non-deviated removal direction. Obviously, the related-art method requires improvements.

SUMMARY OF THE DISCLOSURE

The objective of this disclosure is to provide a removal mechanism of a daughter board for removing a daughter board from a connector.

To achieve the aforementioned and other objectives, this disclosure provides a removal mechanism of a daughter board for removing a daughter board from a connector, and the removal mechanism includes: a fixed frame having a pushed portion; a moving frame movably coupled to the fixed frame and having an oblique tapered edge; a moved frame fixed to the daughter board and having a corresponding oblique edge corresponding to the oblique tapered edge; and a handle rotatably coupled to the moving frame and having a pushing portion rotated with the handle to produce a rotation path where the pushed portion is disposed thereon; wherein the pushing portion rotates with the handle to push the pushed portion; the moving frame pushes the pushed portion by the pushing portion to move relative to the fixed frame; the oblique tapered edge is adopted to push the corresponding oblique edge in the moving process; and the moved frame is pushed by the corresponding oblique edge to drive the daughter board to be removably removed (unplugged) from the connector.

Compared with the related art, this disclosure has the following effects: As long as the handle is turned, the moved frame can be driven to move along the plugging direction to remove the daughter board from the connector, so that the conductive terminals inside the connector and the plug portion of the daughter board will not be damaged easily.

DESCRIPTION OF THE EMBODIMENTS

The technical contents of this disclosure will become apparent with the detailed description of embodiments accompanied with the illustration of related drawings as follows. It is intended that the embodiments and drawings disclosed herein are to be considered illustrative rather than restrictive.

Figure 3:
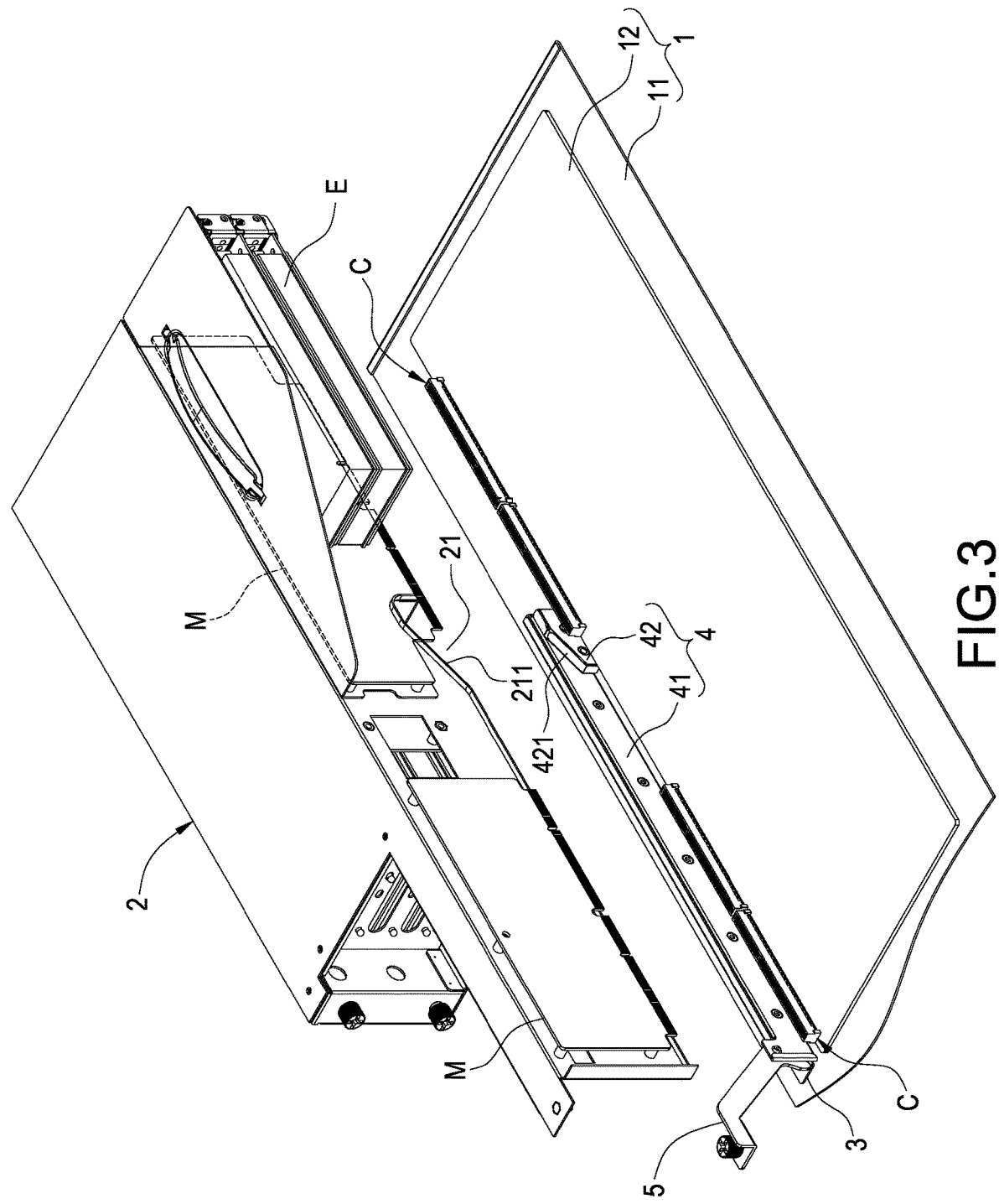
FIG. 3 is an exploded view of a removal mechanism applied between a daughter board and a connector in accordance with this disclosure.

This disclosure discloses a removal mechanism of a daughter board for removing the daughter board M from a connector C as shown in FIG. 3.

With reference to FIGS. 1 to 5 for a removal mechanism of a daughter board (hereinafter referred to as a "removal mechanism") of this disclosure, the removal mechanism includes a moved frame 2, a fixed frame 3, a moving frame 4 and a handle 5. In some embodiments, the removal mechanism may further include a carrying structure 1. The connector C may be various types of connectors capable of plugging and unplugging (removing) the daughter board M. In this embodiment, an edge card connector is used as an example for the illustration, and a rectangular connector C as shown in FIG. 3 has a length, a width, and a height (which are not labelled in the figures). The daughter board M may be any kind of circuit board or any kind of functional circuit board, and a riser card is used as an example in this embodiment for the illustration, and the plugging direction of the daughter board M is parallel to the heightwise direction of the connector C.

The carrying structure 1 may be any structure capable of carrying the fixed frame 3 and the connector C, and a board member is used as an example in this embodiment for the illustration, and the board member includes a carrier board 11 and a motherboard 12, and the motherboard 12 is fixed on the carrier board 11, and the connector C is installed on the motherboard 12. Therefore, the daughter board M has a plug portion (not labeled in the figure) used to be pluggably inserted into the connector C.

The moved frame 2 is fixed on, mounted on, or formed on the daughter board M. In other words, this disclosure does not limit the structure of the moved frame 2, and the moved frame 2 may be a component formed on the daughter board M, or an additional structure installed or fixed on the daughter board M, and an additional structure is used as an example in this embodiment for the illustration.

It is noteworthy that this disclosure does not limit the quantity of daughter boards M fixed or installed on the moved frame 2, and the quantity may be one or an even number, and one daughter board M is used as an example in this embodiment for the illustration of this disclosure.

The fixed frame 3 may be a beam frame fixed on the carrier board 11, the fixed frame 3 may be parallel or adjacent to the connector C, but these arrangements are not limited in this disclosure as long as the removal mechanism of this disclosure is capable of removing the daughter board M from the connector C, and an included angle (not shown in the figures) is produced between the fixed frame 3 and the connector C after the fixation. The fixed frame 3 has a pushed portion 32 formed at an end of the fixed frame 3. The fixed frame 3 further includes a plurality of fisheye slots 33 formed thereon for the purposes of limiting position and guiding.

Figure 6:
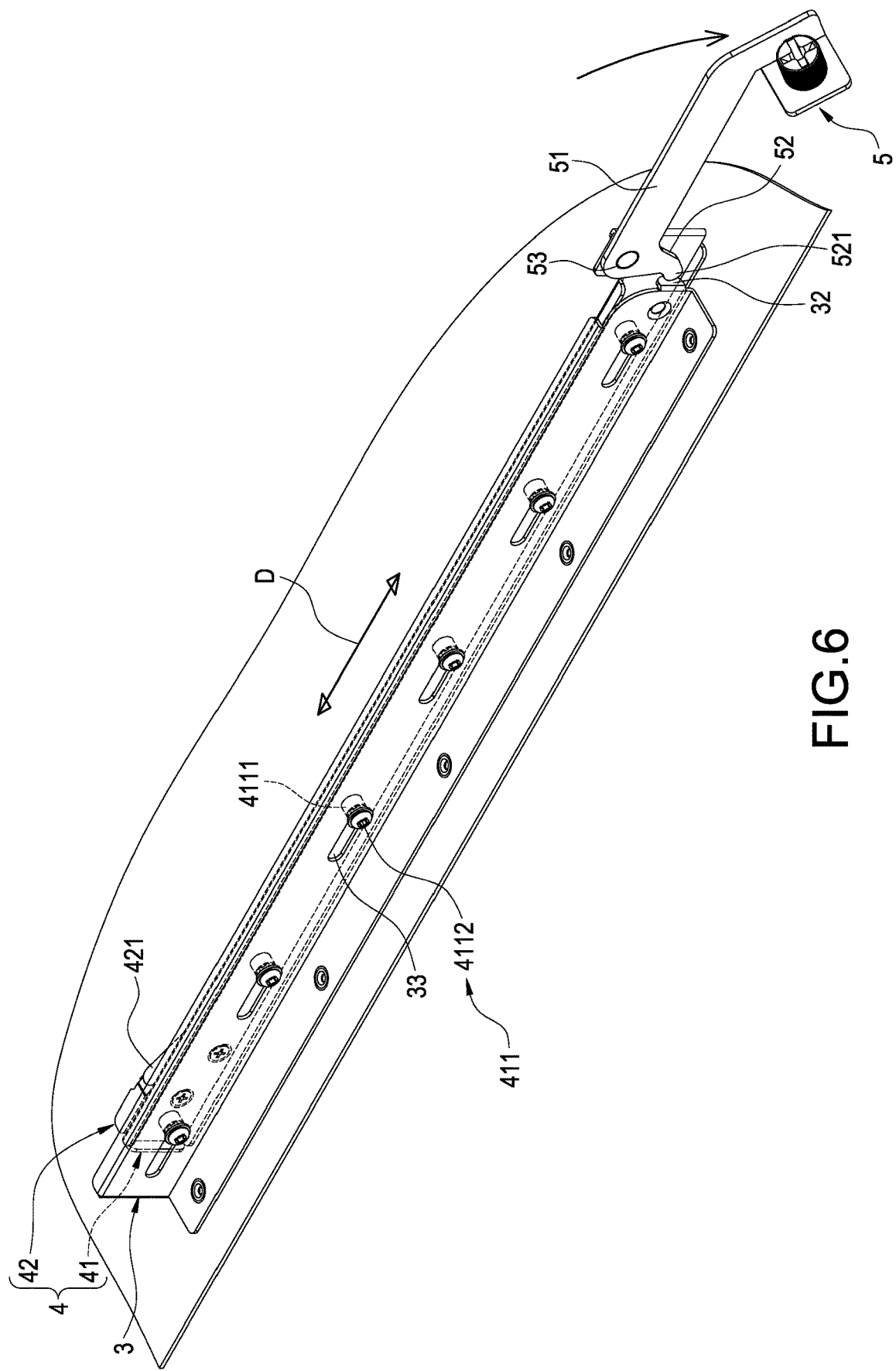
FIG. 6 is a perspective view showing the removal mechanism of FIG. 2 after operation.
Figure 7:
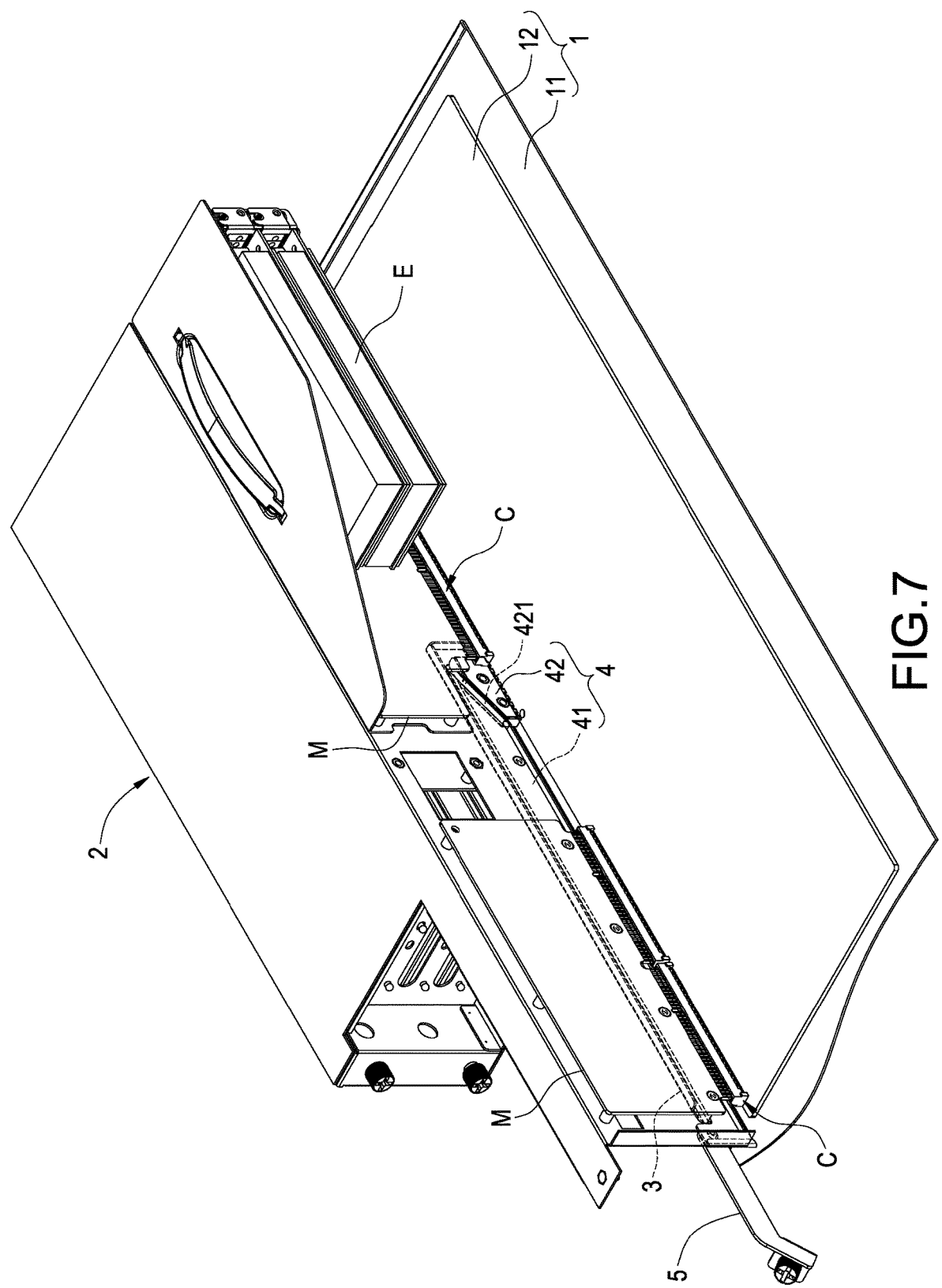
FIG. 7 is a perspective view showing the removal mechanism of FIG. 4 after operation.
Figure 8:
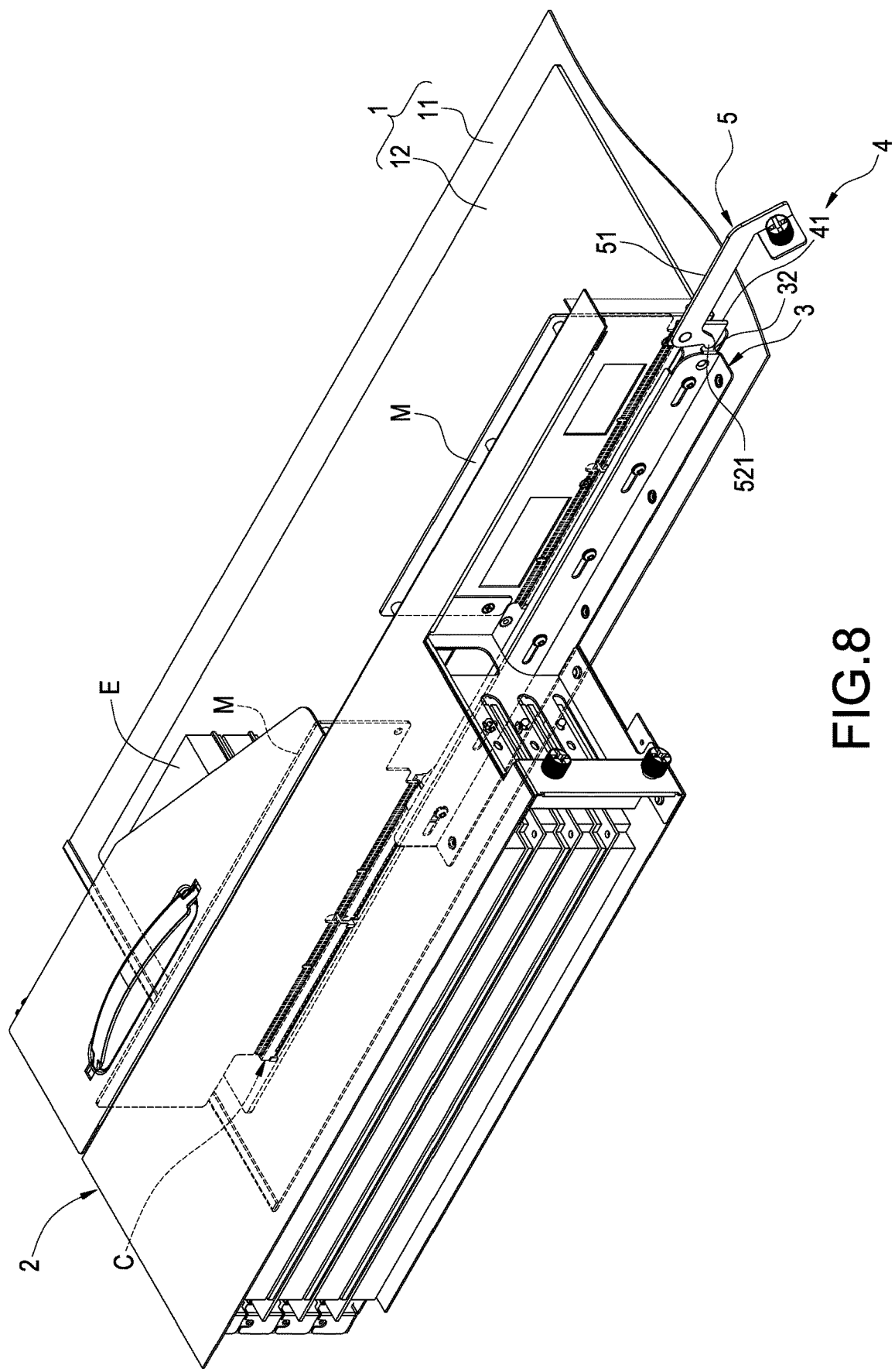
FIG. 8 is a perspective view showing the removal mechanism of FIG. 5 after operation.

The moving frame 4 is movably connected to the fixed frame 3, so that the moving frame 4 may move relative to the fixed frame 3. This disclosure does not limit the way of the moving frame 4 moving relative to the fixed frame 3, and the moving frame 4 may move, rotate, roll or slide, and the moving frame 4 being slidably connected to the fixed frame 3 is used as an example in this embodiment for the illustration of this disclosure. It is noteworthy that the sliding direction D (as indicated in FIG. 6) of the moving frame 4 sliding relative to the fixed frame 3 is parallel to a lengthwise direction of the connector C (or parallel a long side (not labelled in the figure) of the connector C. Further, the sliding direction of other embodiments not shown in the figures may be parallel to a widthwise direction of the connector C or parallel to any direction other than the lengthwise direction or the widthwise direction.

The moving frame 4 may have an oblique tapered edge 421, or be configured to have an oblique tapered edge 421 disposed additionally, and the oblique tapered edge 421 disposed additionally is used as an example for the following illustration of this disclosure. The moving frame 4 includes a frame body 41 and a block 42, and the block 42 is fixed on the frame body 41 and has the oblique tapered edge 421. The frame body 41 may be a beam frame, and the frame body 41 is slidably connected to the fixed frame 3 and arranged adjacent to the fixed frame 3.

The moved frame 2 has a corresponding oblique edge 211 corresponding to the oblique tapered edge 421, but this disclosure does not limit the way how the corresponding oblique edge 211 is formed on the moved frame 2. In this embodiment, the corresponding oblique edge 211 is formed by opening a notch 21 on the moved frame 2, and the corresponding oblique edge 211 is one of the sides that form the notch 21.

The moving frame 4 further includes a plurality of column bodies 411 provided for limiting position and guiding purposes, and each column body 411 is inserted into each fisheye slot 33, so that each column body 411 may be guided and limited by each fisheye slot 33 for the moving frame 4 to slide relative to the fixed frame 3. In an embodiment, the column body 411 includes a plurality of fixed columns 4111 and a plurality of fixing elements 4112, and each fixed column 4111 is protruded from the frame body 41, and the protruding end is configured to be corresponsive to each fisheye slot 33, and each fixing element 4112 has a small body (not labeled in the figures) fixed to the protruding end of each fixed column 4111 to limit the fixed frame 3 between to a large body (not labeled in the figures) of each fixing element 4112 and the frame body 41.

The handle 5 is rotatably connected to the moving frame 4 by the central portion or non-central portion, and an end of the handle 5 has a pushing portion 521. Specifically, the handle 5 is rotatably connected to a first connecting portion 412 of the frame body 41 by the second connecting portion 53 for rotation, and the pushing portion 521 may rotate with the handle 5 to produce a rotation path (not labelled in the figures), and the pushed portion 32 is located on the rotation path.

It is noteworthy that the notch 21 is a triangular notch, and the block 42 is a triangular block substantially in the same shape with the notch 21, and the oblique edge of the triangular block is the oblique tapered edge 421.

Refer to FIGS. 2 and 6, FIGS. 4 and 7, and FIGS. 5 and 8 for comparison between the status before and after operation. When the daughter board M is plugged into the connector C, the block 42 with smaller area enters into the notch 21 with larger area, while the oblique tapered edge 421 is configured to be corresponsive or adjacent to the corresponding oblique edge 211. When the daughter board M is being removed, users may trigger (or press down) the handle 5, so that the handle 5 may rotate with respect to the second connecting portion 53 as the axis, and the pushing portion 521 rotates with the handle 5 to push the pushed portion 32. As a result, the moving frame 4 may slide relative to the fixed frame 3. During the sliding process, the moving frame 4 drives the block 42 to move together, so that the block 42 may push the corresponding oblique edge 211 by the oblique tapered edge 421, and the pull-push effect of the oblique tapered edge 421 and the corresponding oblique edge 211 may drive the moved frame 2 to remove the daughter board M from the connector C along the plugging direction.

Since the plugging direction of the removal mechanism of this disclosure is parallel to the plugging direction when the daughter board M is removed, there is no concern of damaging the conductive terminals inside the connector C or the plug portion (such as the gold finger) of the daughter board M when a slight deviation of the removal direction from the plugging direction occurs, and such arrangement also provides a quick removal to reduce the removal time.

Figure 1:
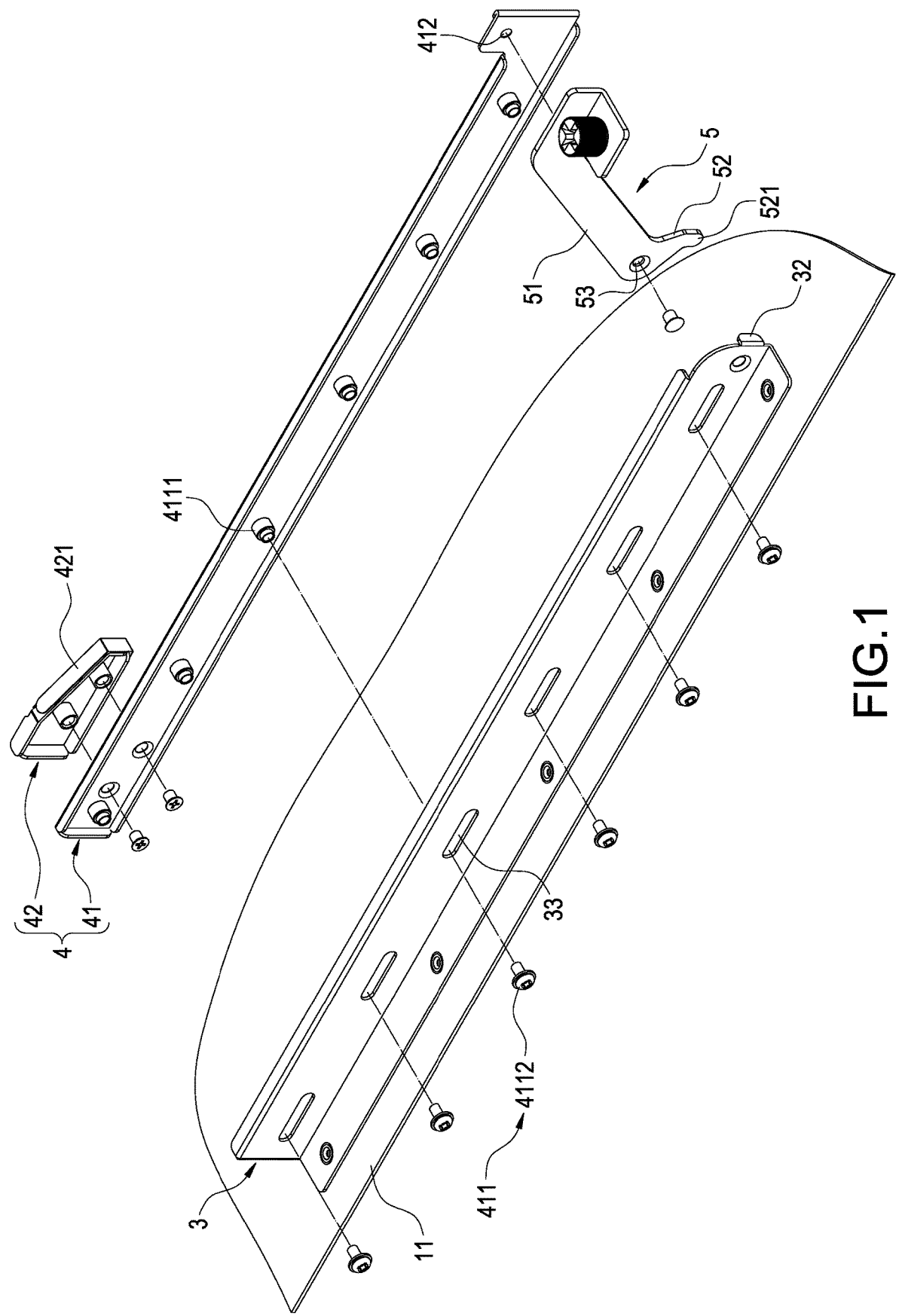
FIG. 1 is a partial exploded view of a removal mechanism of this disclosure.
Figure 2:
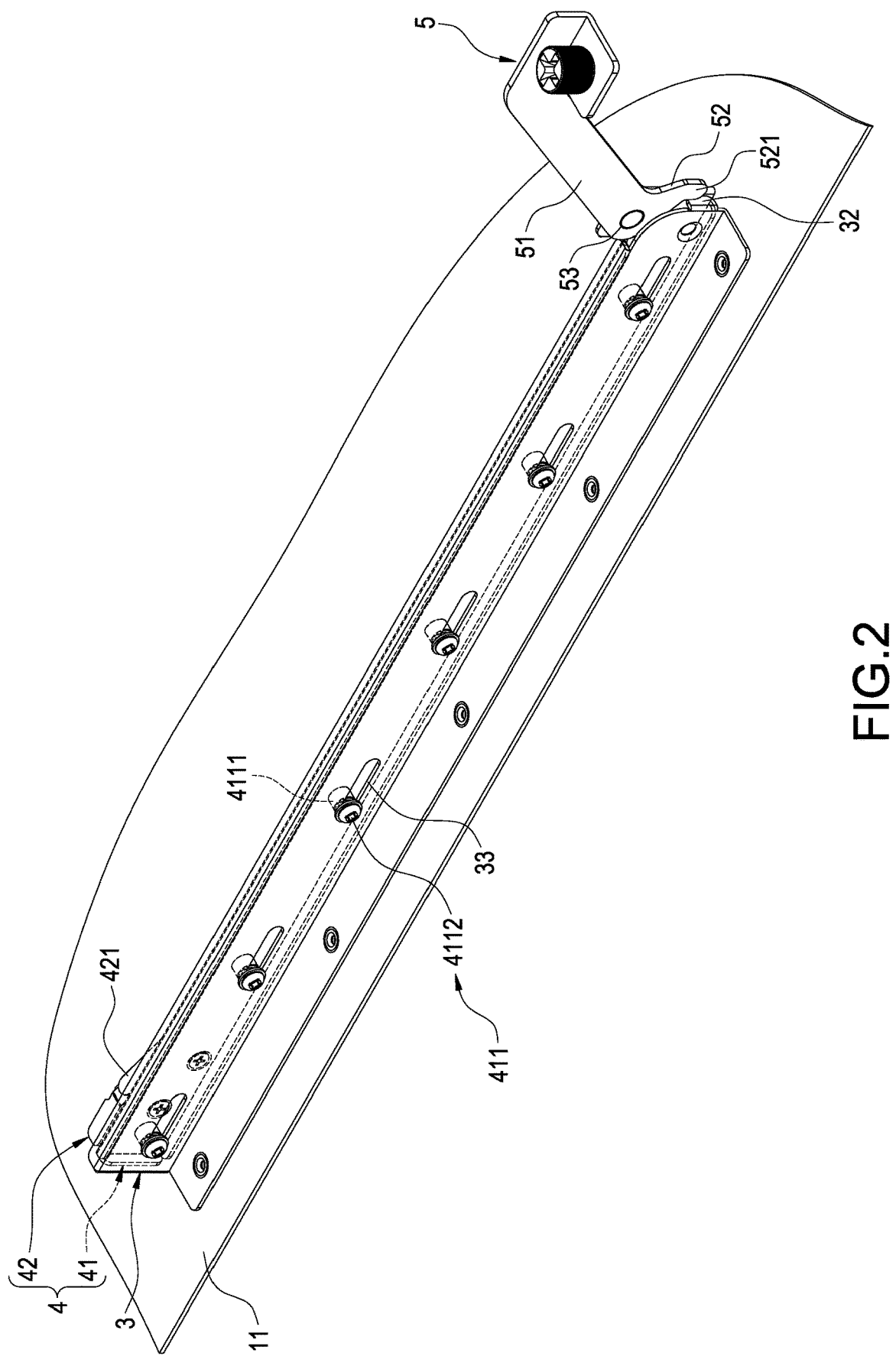
FIG. 2 is a perspective view showing the removal mechanism of FIG. 1 before operation.

To save the laborious effort for the operation of the removal mechanism of this disclosure, as shown in FIGS. 1, 2 and 6, the second connecting portion 53 of the handle 5 is disposed on a non-central position, so that the second connecting portion 53 is used as a boundary to divide the handle 5 into a first moment arm section 51 and a second moment arm section 52, and the pushing portion 521 is disposed on the second moment arm section 52, and a length of the first moment arm section 51 is greater than a length of the second moment arm section 52, so the operation has an effort saving effect.

Figure 4:
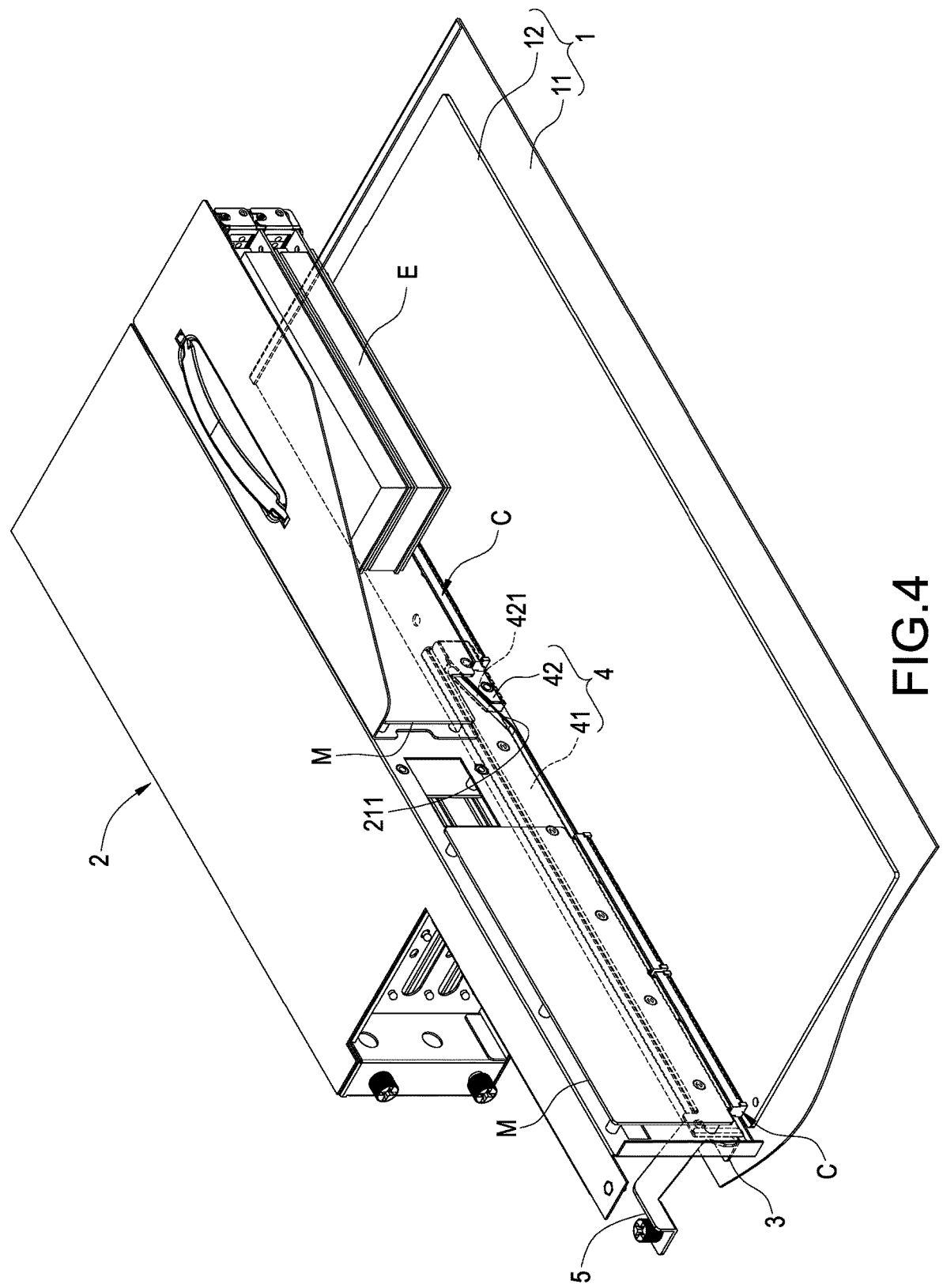
FIG. 4 is a perspective view showing a status of the removal mechanism of FIG. 3 before operation.
Figure 5:
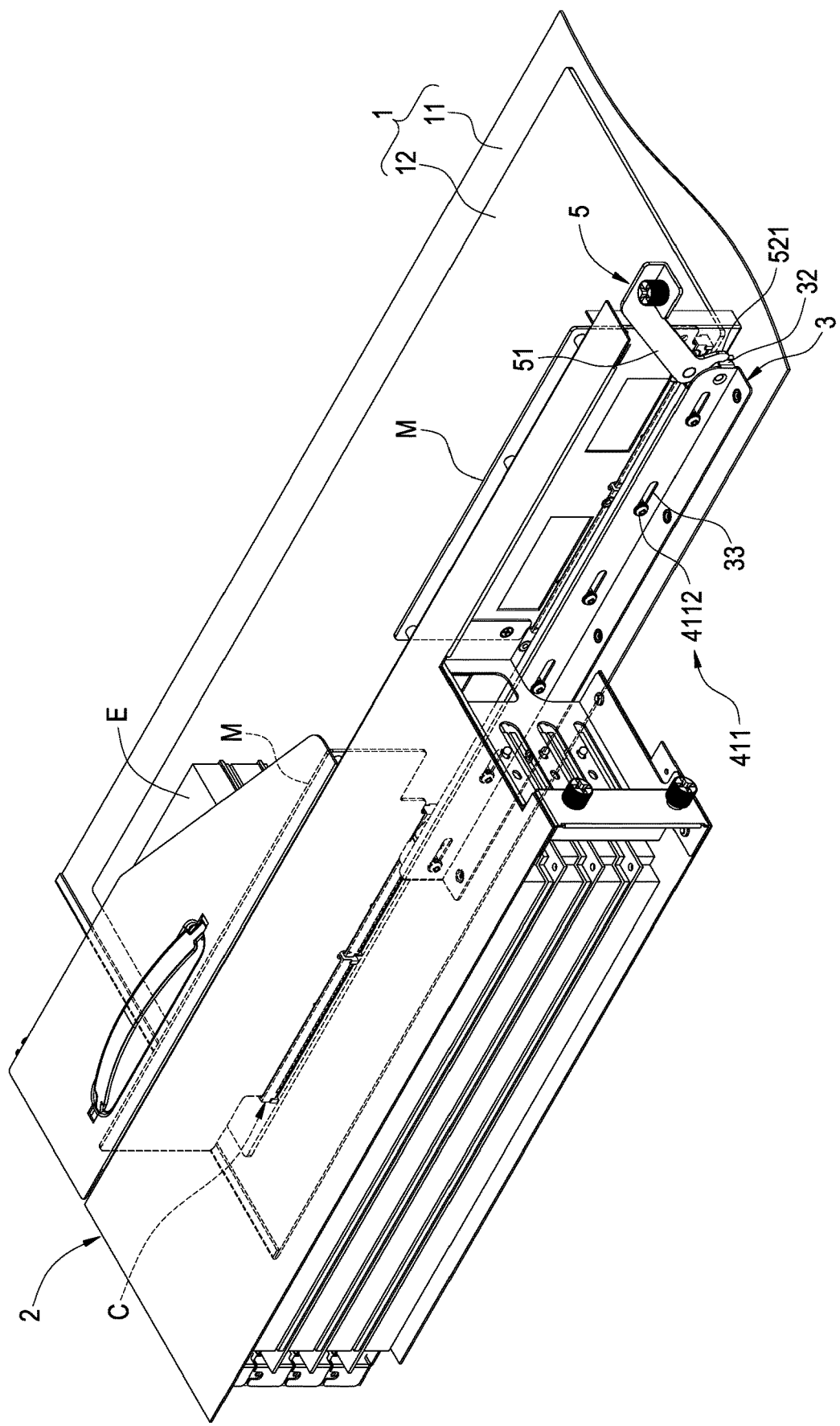
FIG. 5 is another perspective view showing a status of the removal mechanism of FIG. 4 before operation.

The removal mechanism of this disclosure may also be used for multiple daughter boards M in an even number, such as four daughter boards M arranged in a matrix, or two daughter boards M arranged on the left and right sides as shown in FIGS. 3 and 4. In the figures, the moved frame 2 is fixed with the daughter boards M in the even number, and the corresponding oblique edge 211 of the moved frame 2 is disposed on the middle position of each daughter board M. With this arrangement, the users just need single removal mechanism of this disclosure to remove the daughter boards M in the even number simultaneously.

In FIGS. 3 and 4, a plurality of electronic products E (such as a storage device, etc.) may be fixed on the moved frame 2 to expand the functionality of the moved frame 2.

In summation of the description above, the removal mechanism of the daughter board in accordance with this disclosure definitely achieves the expected effects, overcomes the drawbacks of the related art, and complies with patent application requirements, and thus is duly filed for patent application.

While this disclosure has been described by means of specific embodiments, numerous modifications and variations could be made thereto by those skilled in the art without departing from the scope and spirit of this disclosure set forth in the claims.

What is claimed is:

1. A removal mechanism of a daughter board, for removing the daughter board from a connector, the removal mechanism comprising:
a fixed frame, comprising a pushed portion;
a moving frame, movably coupled to the fixed frame, and comprising an oblique tapered edge;
a moved frame, fixed to the daughter board, and comprising a corresponding oblique edge corresponding to the oblique tapered edge; and
a handle, rotatably coupled to the moving frame, and comprising a pushing portion rotating with the handle to produce a rotation path where the pushed portion is disposed thereon;
wherein, the pushing portion rotates with the handle to push the pushed portion, and the moving frame pushes the pushed portion by the pushing portion to move relative to the fixed frame, and the oblique tapered edge is adopted to push the corresponding oblique edge in a moving process, and the moved frame is pushed by the corresponding oblique edge to drive the daughter board to be removed from the connector.

2. The removal mechanism of the daughter board in claim 1, further comprising: a carrying structure, the connector being installed thereon, and the fixed frame being fixed thereon.

3. The removal mechanism of the daughter board in claim 2, wherein the carrying structure comprises a carrier board and a motherboard, and the motherboard is fixed on the carrier board and the connector is installed on the motherboard, and the fixed frame is fixed on the carrier board.

4. The removal mechanism of the daughter board in claim 1, wherein the moving frame slidably coupled to the fixed frame, and a moving direction of the moving frame relative to the fixed frame is parallel to a lengthwise direction or a widthwise direction of the connector.

5. The removal mechanism of the daughter board in claim 1, wherein the moved frame is pushed by the oblique tapered edge of the moving frame toward a heightwise direction of the connector to remove the daughter board.

6. The removal mechanism of the daughter board in claim 1, wherein the moving frame comprises a frame body and a block, and the frame body is movably coupled to the fixed frame and rotatably coupled to the handle, and the block is fixed to the frame body and comprises the oblique tapered edge.

7. The removal mechanism of the daughter board in claim 1, wherein the handle comprises a connecting portion, and the handle rotatably coupled to the moving frame by the connecting portion, and the handle is divided into a first moment arm section and a second moment arm section by the connecting portion, and the pushing portion is disposed on the second moment arm section, and a length of the first moment arm section is greater than a length of the second moment arm section.

8. The removal mechanism of the daughter board in claim 1, wherein the moved frame is fixed with multiple daughter boards in an even number, and the corresponding oblique edge is located on a middle position of each of the daughter boards.

9. The removal mechanism of the daughter board in claim 1, wherein a notch is disposed on the moved frame and configured by a plurality of sides, and the corresponding oblique edge is one of the sides.

10. The removal mechanism of the daughter board in claim 9, wherein the notch is a triangular notch, and the moving frame comprises a frame body and a block, and the frame body is movably coupled to the fixed frame and rotatably coupled to the handle, and the block is fixed to the frame body and comprises the oblique tapered edge, and the block is a triangular block.

* * * * *